Figure 6:
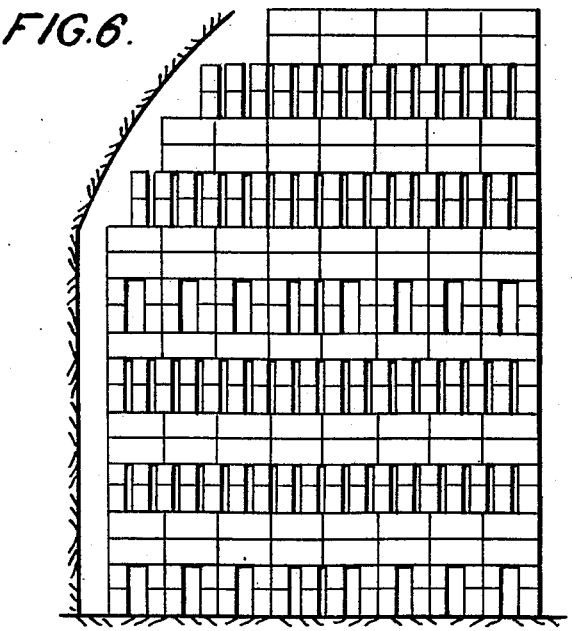

Dec. 10, 1963    J. PAISLEY    3,113,682
APPARATUS FOR ADJUSTING THE SPACING OF SPACED
ROWS OF ARTICLES UPON A SUPPORT
Filed Sept. 27, 1960    5 Sheets-Sheet 1
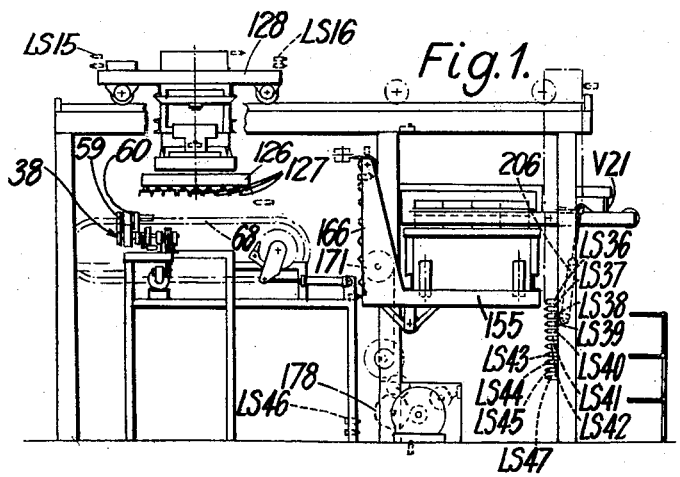
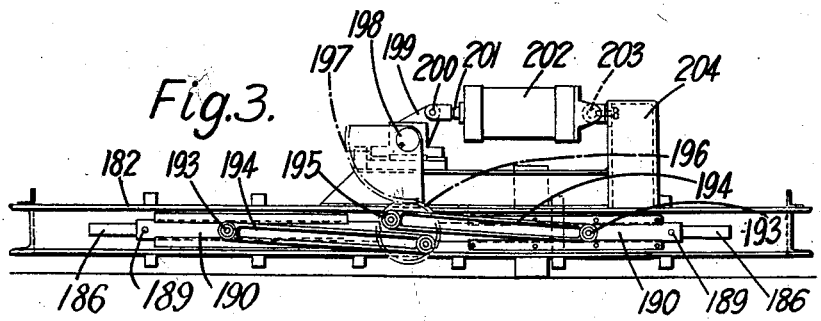
INVENTOR
John Paisley
BY
Watson, Cole, Grindle & Watson
ATTORNEYS

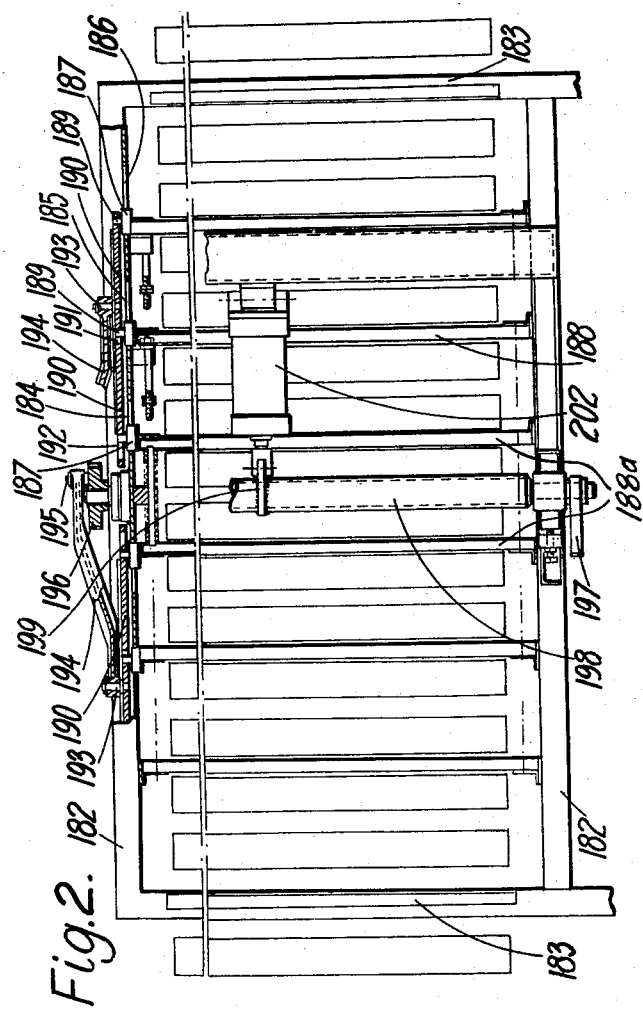

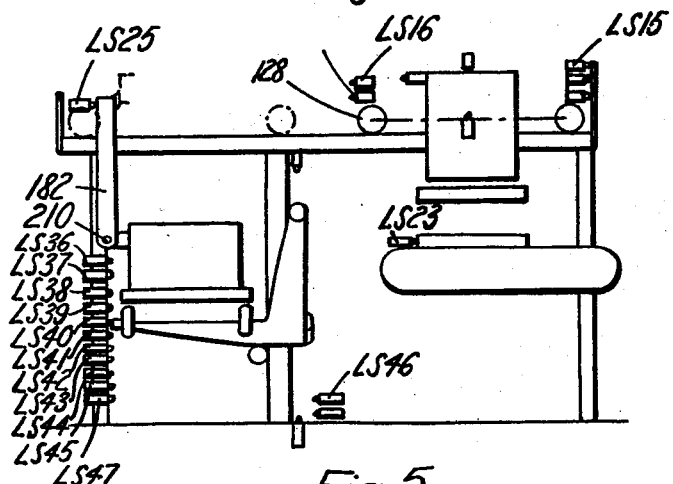
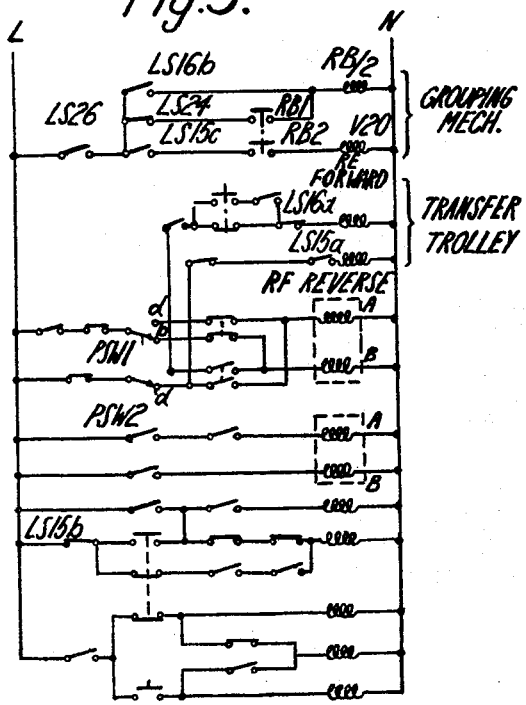

Dec. 10, 1963   J. PAISLEY   3,113,682
APPARATUS FOR ADJUSTING THE SPACING OF SPACED
ROWS OF ARTICLES UPON A SUPPORT
Filed Sept. 27, 1960   5 Sheets-Sheet 4

23rd
22nd
21st
20th
19th
18th
17th
16th
15th
14th
13th
12th
11th
10th
9th
8th
7th
6th
5th
4th
3rd
2nd
1st

INVENTOR: John Paisley
ATTORNEYS:
Watson, Cole, Grindle & Watson

United States Patent Office
3,113,682
Patented Dec. 10, 1963

3,113,682
APPARATUS FOR ADJUSTING THE SPACING OF SPACED ROWS OF ARTICLES UPON A SUPPORT
John Paisley, London, England, assignor to Eastwoods Limited, London, England, a British company
Filed Sept. 27, 1960, Ser. No. 58,824
9 Claims. (Cl. 214—6)

This invention relates to apparatus for adjusting the spacing of spaced rows of articles upon a support and particularly for spacing rows of bricks forming a layer on a support preparatory to another layer of bricks being deposited upon it with the bricks of one layer resting across the bricks of the next layer which deposition of the various layers is successively carried out to form a stack having the required height and width for introduction into a brick kiln. In the case where a number of super-imposed layers of bricks are to be transported from a stacking location to the brick kiln, it may be inconvenient to transport a stack having the overall height and width of the kiln and thus smaller stacks may be initially built up having half the height and half the width of the kiln which half height and half width stacks are appropriately assembled in the kiln. By these means the initially formed stacks are of a convenient size and weight for transport by a fork lift truck.

The fork arms of the fork lift truck require to be inserted between the rows of bricks in the bottom layer or bottom two layers and the bricks in the next layer then extend across the top faces of the arms. It is desirable under such circumstances for the bricks in the bottom layer or bottom two layers of each half height stack to be spaced differently from those of the other layers. An object of the present invention is to provide mechanical means for effecting the different spacings.

According to this invention an apparatus for adjusting the spacing of spaced rows of articles which have been deposited and rest freely on a support comprises a frame movably mounted on a fixed part of the apparatus so that it may be moved towards and away from the support and is provided with a number of elements which, when the frame is adjacent the support, are disposed on opposite sides of each row along the length thereof and are adjustable in a direction transverse to said length, and means for imparting adjusting movement to said elements after the articles have been deposited on said support.

In the case where a number of layers of articles, each having a number of spaced rows, are disposed one above the other upon said support, the aforesaid adjustable elements may comprise a number of parallel bars which are adjustable towards and away from one another and between which are disposed said rows of articles.

At one limit of movement of adjustment the distance between adjacent bars may be sufficient to accommodate two spaced rows of articles as deposited upon the support and the other limit of adjustment the two rows between adjacent bars are brought together and the resulting double rows are so spaced apart that the overall span of the layer remains substantially the same.

In one form of construction according to the invention the aforesaid bars are mounted between two opposite side members of a frame so that the ends of the bars or parts secured thereto are slidable along guideways of different lengths formed in said side members and which ends or parts secured thereto are formed with projections which extend into apertures of different lengths in a control member which is adjustable along said side members, and operating mechanism is provided for imparting movement to said control member.

Two sets of bars and associated control members may be arranged one on either side of the centre of said frame and said control members are arranged to be operated by the same mechanism.

The operating mechanism may comprise a shaft rotatably mounted in said frame so as to extend across the width thereof, and a crank disc is secured to each end of said shaft and the two control members on each side of the frame have pivotally connected thereto, connecting rods which are pivoted to said crank disc at opposite ends of a diameter.

The aforesaid crank disc may comprise a gear wheel which is engaged by a toothed quadrant fixed to a shaft which is oscillated by a fluid motor carried by said frame.

There may be associated with the mechanism described above marshalling apparatus for assembling the articles and grippers which descend and grip the assembled articles raise them and move them over a support, descend and release the articles onto the support and the aforesaid means for imparting adjusting movement to the bars is jointly controlled by the downward movement of the grippers and by a moving part associated with the means for marshalling the article.

Figure 7:
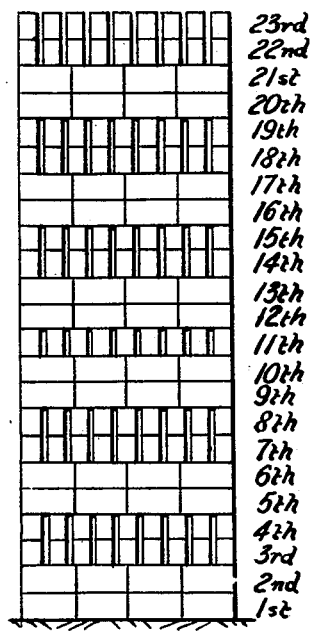
Figure 8:
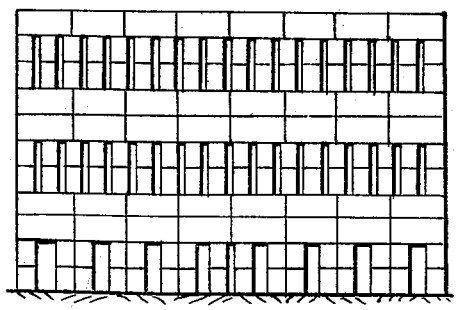
Figure 9:
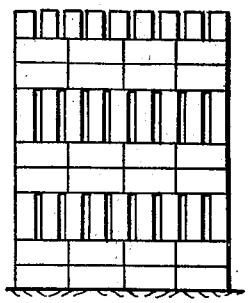
Figure 10:
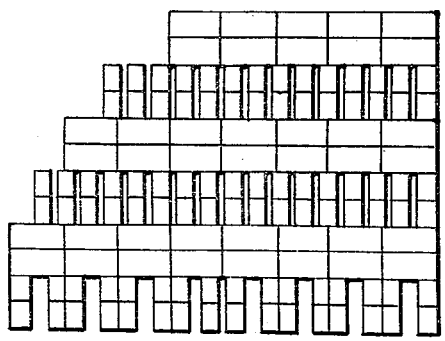
Figure 11:
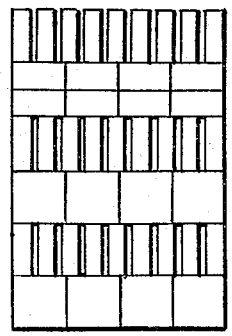

The following is a description of a grouping frame as applied to a brick setting or stacking apparatus reference being made to the accompanying drawings in which:

FIGURE 1 is a side view of the part of the apparatus;
FIGURE 2 is a plan view partly in section of a grouping frame for the rows of bricks;
FIGURE 3 is a side elevation of the grouping frame;
FIGURE 4 is a diagrammatic side elevation of the marshalling conveyor, transfer carriage and lift showing the positions of certain of the pneumatic contact valves;
FIGURE 5 shows the electric circuit associated with the grouping mechanism and transfer carriage;
FIGURE 6 is a front view of the lower and upper stacks which after being formed in the apparatus are superimposed and accommodated in the kiln chamber at one side thereof;
FIGURE 7 is a side view of these superimposed stacks;
FIGURE 8 is a front view of the lower stack after formation in the apparatus;
FIGURE 9 is a side view of the lower stack;
FIGURE 10 is a front view of the upper stack after formation in the apparatus; and
FIGURE 11 is a side view of the upper stack;

Bricks are delivered from brick presses under control of a sequencing mechanism on to a feed conveyor 38 (see FIGURE 1) which delivers them between guide plates 59, 60 on to a marshalling conveyor 68. The marshalling conveyor is moved step by step by indexing mechanism so that a number of spaced rows of bricks are formed upon it. After a predetermined number of rows have been marshalled two frames 126 (only one of which can be seen in the drawing) carrying a number of grippers 127 (one for each brick) are lowered. The bricks are gripped and the frames raised again. The frames are mounted on a transfer carriage 128 which is then moved over the platform 155 of a lift. The platform carries a truck. The frames 126 are again lowered, the grippers are released so as to deposit the rows on to the truck. The transfer carriage 128 then returns to initial position to receive fresh rows of bricks which have in the meantime been marshalled. When the lift platform has received each layer of bricks it descends an amount equal to the height of a layer and in so doing operates one of a number of line switches LS36 to 47 which control the setting of a number of stops, associated with the marshalling conveyor, which determine the number of bricks in each row.

The grouping of the bricks in the two bottom layers requires to be different from the grouping of those in the next layer (see FIGURE 6). In each of the two bottom layers each outside row and each of the two center rows requires to be four single bricks end-to-end and the other rows require to be arranged in pairs, the rows in each pair being in contact side by side, the pairs of rows being separated by a gap from each other and from the outside rows and from the center rows. Thus there will be three double rows, a single outside row at each end instead of eight single spaced rows as originally delivered eight at a time on to the truck.

To accomplish this there is provided a grouping frame shown in FIGURES 2 and 3 which is mounted to swing about a horizontal axis 210 between horizontal and vertical positions as best seen in FIGURE 4. The grouping frame is provided with two opposite side frame members 182 which are of such a length as to lie across fourteen of the rows of bricks which have been deposited on the platform. End members 183 lie between each outer row and the next row. The frame can be considered to be in two halves and each side member 182 is provided on each side of a centre line with three slots 184, 185, 186 of increasing length, those nearer an end frame member 183 being greater. Slidably mounted in each slot is a block 187 and extending from each block on one side of the frame to a corresponding block on the other side of the frame are grouping bars 188 which bars extend through the spaces between every other row of bricks. Each block is provided with a pin 189 projecting from its outer face. Slidably mounted on the outside of each half of each side member is a control bar 190 having a hole in its outer extremity which engages the pin on the block which is in the longest slot 186 while the other pins 189 extend through slots 191, 192 in the control bar 190, the slot 192 at the inner end of each bar 190 being larger than the adjacent slot 191. Each of the two bars 190 on each side of the frame has pivoted to the outer face thereof, by a pivot 193, one end of a bent link 194 the other end of which is pivoted by a pin 195 to a face of a pinion 196 pivotal, the connections of the two links being diametrically arranged. The lengths of the slots 184, 185, 186 are at least sufficient to allow the movement of the blocks 187 in them.

The pinion 196 on each side of the frame is engaged by an arcuate rack 197, the racks being fixed to a cross shaft 198 having a lever arm 199 at its centre to which is pivotally connected at 200 the piston rod 201 of a pneumatic motor, the cylinder 202 of which is disposed substantially horizontally and is pivoted at 203 to a fixed part 204 of the frame. By suitably selecting the lengths of the aforesaid slots reciprocation of the piston rod will group the rows of bricks in the required manner. The grouping frame is raised and lowered by a motor 206 (FIGURE 1) the control valve V20 of which being operated electromagnetically by a circuit including the switches LS26, LS16b, LS24, LS15c, and RB1 and RB2 (FIGURE 5). The motor cylinder 202 is controlled by a valve (not shown) which is operated by the last part of the downward swing of the grouping frame.

In order to build up successive layers of bricks the marshalling feed conveyor 38 feeds the bricks end to end lengthwise on to the marshalling conveyor 68 which is traversed step-by-step until eight spaced rows each of up to eight bricks are formed according to the setting of certain stops associated with the marshalling apparatus. The two gripping frames 126 then descend and the grippers 127 grip the rows of bricks and the frames are raised, separated, rotated through 90°, brought together again and are then moved by the transfer trolley over the lift whereupon the gripping frames descend, the grippers release the bricks on to the support or on to a truck on the lift and after the first two layers have been deposited the grouping frame comes into operation. In the meantime the next nine rows of bricks are being assembled on the marshalling conveyor and the transfer trolley 128 returns the gripping frames back again over them. The frames are again lowered, the grippers grip the rows of bricks and the frames 126 are elevated without rotation whereupon the transfer trolley moves them over the lift 155 where they are lowered and the grippers opened to deposit the bricks, so that they extend across the bricks of the first two layers. The platform descends and the transfer trolley again returns and picks up the next layer and deposits them on the lift without the frames being rotated and so on.

If a square stack of bricks is to be formed the same number of bricks are fed by the marshalling feed conveyor in each cycle; but where the roof is arch shaped, which is usually the case the number of bricks in the upper layers requires to be diminished.

Referring to FIGURES 6 to 11, in the case of a kiln chamber having an arched roof it is convenient to build up each half of the kiln on one side of a vertical central plane extending along the length of the kiln to the full height in two stages so that the marshalling conveyor is arranged to feed, to the lift, two successive stacks each of about one half the height of the kiln and half the width as shown in FIGURES 7 and 8. In the present instance the lower stack has eleven layers and the upper one has twelve layers and each stack is half the width and half the height of the kiln. In the two superimposed stacks containing the twenty-three layers there are two forms of layer to be marshalled. In the following description a reference to a row of bricks means a number of bricks arranged end to end and which when viewed from an end appear as headers and when viewed from a side appear as stretchers.

The two forms of layer are as follows:

(a) Those which when first marshalled comprise nine rows of equal number of bricks, e.g., eight end to end, but which when engaged by the gripping heads and rotated may produce eighteen rows of four bricks end to end.

(b) Those in which when first marshalled there are rows containing a various number of bricks arranged end to end.

The marshalled layers which fall into the category (a) are 3, 4, 5, 6, 7, 8, 9, 10, 11, 14 and 15 and which when gripped by the gripping head and in some cases rotated produce the following numbers of rows; layers 3 and 4 have nine rows of eight bricks; layers 5 and 6 have eighteen rows of four bricks; layers 7 and 8 have nine rows of eight bricks; layers 9 and 10 have eighteen rows of four bricks; layers 11, 14 and 15 have nine rows of eight bricks; layers 18 and 19 have nine rows of seven bricks; layers 22 and 23 each have nine rows of five bricks.

The layers falling into category (b) are numbers 1, 2, 12, 13 each when initially marshalled have eight rows of eight bricks and one empty row and which after being gripped by the gripping heads and rotated produce sixteen rows of four bricks in each of the layers.

Also in the same category (b) are layers 16 and 17 each with eight rows of eight bricks and one row of four bricks, and after being gripped and rotated by the gripping head produce seventeen rows of four bricks.

Layers 20 and 21 each provide for five rows of eight bricks when rotated form 10 rows of four bricks and which together with four rows of four bricks makes a total of fourteen rows of four bricks.

The layers falling into category (a) are marshalled by arranging the movement of the lift to actuate directly switches in circuit with the means which actuate the required stops and maintaining this contact until the layer is completed.

Those in category (b) are marshalled by switching via one of a number of intermediary switches controlled by one of a number of cam plates moving round under the action of the indexing mechanism shaft.

As there are only three layer forms in category (b) it will be seen that complete control of the brick pattern in any layer can be achieved by providing a switch for each layer controlled by the movement of the lift.

The layer selection for two successive stacks is controlled by switches.

The grouping mechanism only requires to come into operation when the first two layers of each stack are positioned on the truck, therefore the need for the grouping mechanism will always be determined when the lift is in the same position. Therefore, with the first layer of bricks on the truck, the lift will move down a layer thus operating LS26 (FIGURES 4 and 5). In this position, the transfer carriage will bring the second layer into the truck area and deposit the second layer on top of the first. In doing so it will have operated LS16b (FIGURE 5) thus energising relay RB/2. This relay will be maintained in operation by the action of LS24 (mounted on grouping mechanism) when LS16b opens due to transfer carriage moving away to the marshalling conveyor. When the transfer carriage has reached the marshalling area LS15c is made so that a circuit is completed through to V20 (FIGURE 5) (valve controlling raising and lowering of grouping mechanism by the motor 206).

The grouping mechanism is lowered into position over the two base layers and in doing so LS25 (FIGURE 4) is opened to prevent any further movement of the lift which in its turn prevents movement of the transfer carriage.

The grouping mechanism once down will depress a valve V21, which controls the motor 202 to obtain the grouping action. When the action is completed LS24 will have been operated thus de-energising RB/2 and allowing grouping mechanism to be raised clear. The grouping mechanism action will be re-set by releasing V21 when grouping bars are clear of bricks and LS25 will close when the frame is vertical. Details of the two transfer frames 126 and mechanism causing them to separate, rotate relative to each other and then come together again is set out in the specification of copending application Serial No. 58,246 to which reference may be made for these details.

A complete brick setting machine to which the present invention is applicable together with its electric and pneumatic controlling circuits is described and illustrated in the specification of application No. 58,246

I claim:

1. An apparatus for varying the distance apart of spaced rows of articles comprising a platform on which rows of articles are marshalled at a constant distance apart, a set of grippers arranged in rows at the same distance apart upon a transfer mechanism adapted to deposit the rows of articles in a first spaced relationship on a vertically movable support disposed away from said platform, a grouping frame separate from and additional to said set of grippers and movably mounted on a fixed part of the apparatus so as to be movable from one position in which it surrounds the rows of articles on the support to another position in which it is clear of the support, a number of elements mounted in guideways and spaced apart in the frame so as to lie between the rows of articles when the frame is in said one position, and means for imparting movement to said elements in said guideways whereby the rows are brought into a second spaced relationship.

2. An apparatus according to claim 1 wherein said elements comprise a number of parallel bars having their ends mounted in guideways in opposite members of said grouping frame.

3. An apparatus according to claim 1 wherein said elements comprise a number of parallel bars having their ends mounted in guideways in opposite members of said grouping frame and wherein the means for imparting movement to said elements comprise a structure reciprocable along said frame and lost motion connection between said structure and said elements providing for different lengths of lost motion whereby different extents of movement are imparted to said elements by the movement of said structure, each of which elements engages one side of a row of articles during at least a part of its movement.

4. An apparatus according to claim 1 wherein said elements comprise a number of parallel bars having their ends mounted in guideways of different lengths in opposite side members of said grouping frame and which ends are formed with projections which extend into apertures of different lengths in a control member which is adjustable along a side member, and operating mechanism is provided for imparting movement to said control member.

5. An apparatus according to claim 1 wherein said elements comprise two sets of parallel bars having their ends mounted in guideways of different lengths in opposite members of said grouping frame, which ends of the bars are formed with projections which extend respectively into apertures of different lengths in two control members arranged one on either side of the center of each side of the frame and operating members adapted to impart opposite movements to each said two control members.

6. An apparatus according to claim 4 wherein said operating mechanism comprises a shaft rotatably mounted in said frame so as to extend across the width thereof, and a crank disc is secured to each end of said shaft and the two control members on each side of the frame have pivotally connected thereto connecting rods which are pivoted to said crank discs at opposite ends of a diameter.

7. An apparatus according to claim 4 wherein said operating mechanism comprises a shaft rotatably mounted in said frame so as to extend across the width thereof, and a crank disc is secured to each end of said shaft and the two control members on each side of the frame have pivotally connected thereto connecting rods which are pivoted to said crank disc at opposite ends of a diameter, and wherein each said crank disc comprises a gear wheel which is engaged by a toothed quadrant fixed to a shaft which is oscillated by a fluid motor carried by said frame.

8. An apparatus according to claim 1 in which movement of said grouping frame to said one position actuates a control for a motor which imparts movement to said elements.

9. An apparatus according to claim 1 in which movement of said grouping frame to said one position actuates a control for a motor which imparts movement to said elements and in which movements of said elements towards each other conditions means for moving said grouping frame clear of said support.

References Cited in the file of this patent
UNITED STATES PATENTS

| | | |
|---|---|---|
| 1,418,003 | Ladd | May 30, 1922 |
| 1,710,096 | Luce | Apr. 23, 1929 |
| 1,922,560 | Sullivan | Aug. 15, 1933 |
| 2,755,611 | McGihon | July 24, 1956 |
| 2,828,871 | Bardsley | Apr. 1, 1958 |
| 2,949,179 | Busse | Aug. 16, 1960 |
| 2,951,574 | Craig | Sept. 6, 1960 |

FOREIGN PATENTS

| | | |
|---|---|---|
| 1,061,677 | Germany | July 16, 1959 |